Oct. 8, 1963   O. A. CLARK   3,106,254
IMPLEMENT HITCH FOR TRACTORS
Filed Oct. 23, 1961
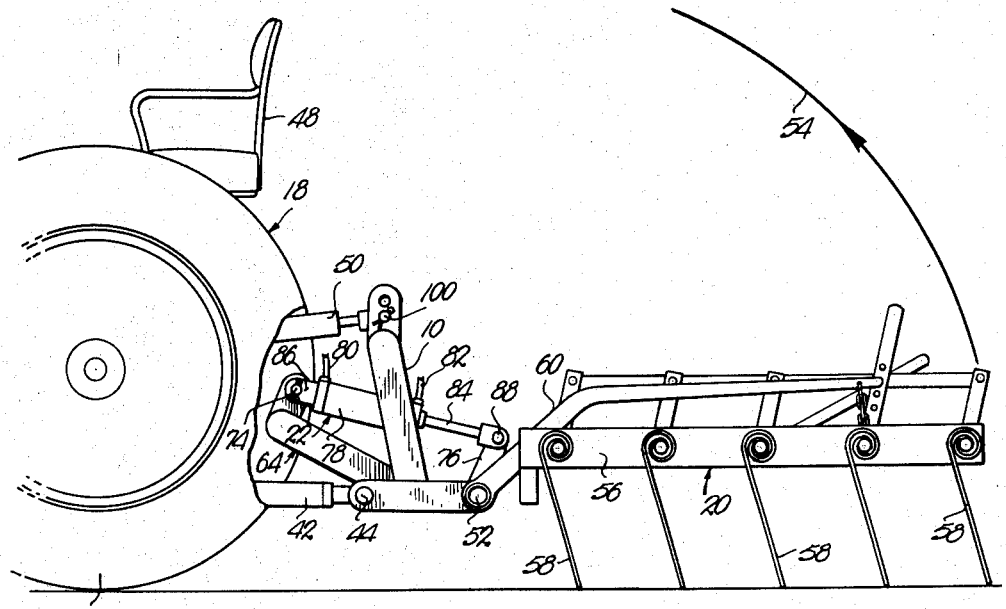
Fig. 1.
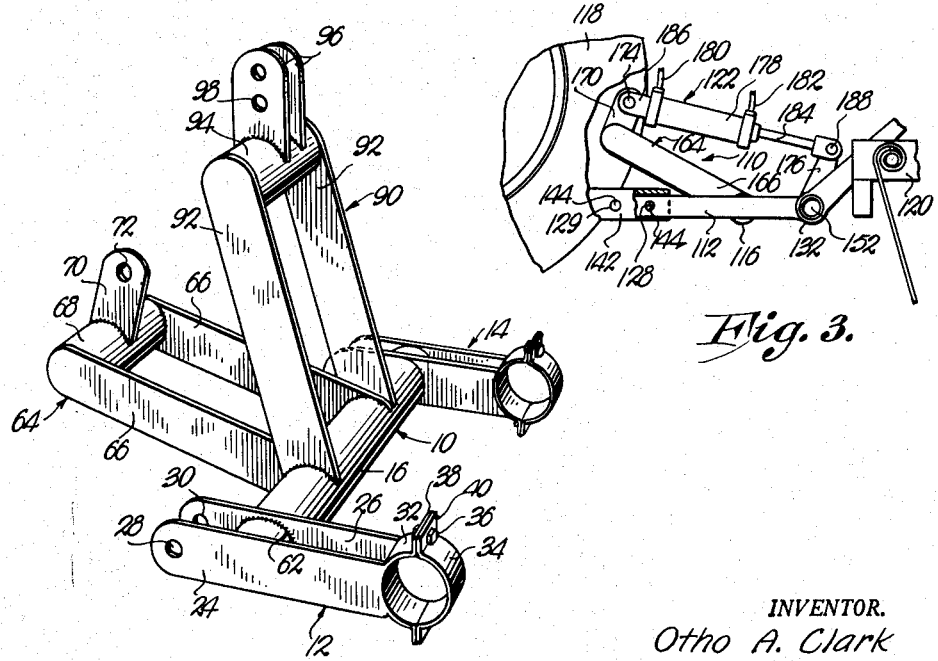
Fig. 2.
Fig. 3.
INVENTOR.
Otho A. Clark
BY
Hovey, Schmidt, Johnson & Hovey
ATTORNEYS.

United States Patent Office 3,106,254
Patented Oct. 8, 1963

3,106,254
IMPLEMENT HITCH FOR TRACTORS
Otho A. Clark, Atherton, Mo., assignor to Clark Manufacturing Company, Atherton, Mo., a partnership
Filed Oct. 23, 1961, Ser. No. 147,002
3 Claims. (Cl. 172—474)

This invention relates to a hitch for interconnecting a farm tractor with a farm implement, and more particularly, for use with a conventional multiple point mounting system on a tractor for mounting the implement on the tractor so that the implement may be moved into any one of a number of operative positions.

It is the primary object of the present invention to provide a unitary hitch for interconnecting a farm implement with a conventional, vertically shiftable, multiple point mounting system of a farm tractor wherein the hitch is provided with means for swinging the implement in a vertical arc relative to the mounting system, so that, by judiciously combining the vertical movements of the mounting system and the hitch, the implement is caused to assume any one of a plurality of operating positions relative to the ground not heretofore attainable through shifting of the implement by the use of the mounting system alone.

Another object of the present invention is the provision of rearwardly extending journal means on the aforesaid hitch for rotatably mounting the farm implement on the hitch, whereby the implement is rendered swingable relative to said hitch and said tractor and movable in a vertical arc about a horizontal axis through the journal means.

A further object of the present invention is the provision of a remotely actuatable power device carried by said hitch and operably coupled to the aforesaid farm implement for swinging the latter relative to the hitch, whereby, upon actuation of said device by the operator of the tractor, the implement is caused to swing into the operative positions thereof even though said implement is being towed by said tractor.

Other objects of the present invention will become apparent as the following specification progresses, reference being had to the accompanying drawings, wherein:

FIGURE 1 is a fragmentary, side elevational view of the hitch which is one embodiment of this invention, illustrating the interconnection thereof with a farm implement and a tractor having a 3-point mounting system;

FIG. 2 is a perspective view of the hitch shown in FIG. 1 and illustrating the various components thereof adapted to be coupled to the tractor and implement respectively; and FIG. 3 is a fragmentary, side elevational view of a hitch which forms a second embodiment of the present invention and illustrating the interconnection thereof with a farm implement and a tractor having a 2-point mounting system.

The hitch unit illustrated in FIGS. 1 and 2, and representing the first embodiment of this invention, is broadly denoted by the numeral 10 and comprises a pair of elongated, normally horizontally disposed hitches 12 and 14 interconnected intermediate the ends thereof by an elongated, tubular beam 16.

Hitch 10 is adapted to interconnect a tractor 18 with a farm implement 20 so that tractor 18 is in towing relationship to implement 20, and further, to support a power device 22 coupled therewith and with implement 20 for shifting the latter into any one of a number of operative positions in a manner to be described.

Each of said hitches 12 and 14 includes a pair of generally parallel plate members 24 and 26 having attachment means in the nature of aligned openings 28 and 30 respectively at the normally forwardmost ends thereof, and journal means in the nature of a pair of semicircular bands 32 and 34 respectively at the normally rearmost ends thereof. Bands 32 and 34 are interconnected by suitable fastening means 36 on outwardly extending flanges 38 and 40 thereof. Each hitch 12 and 14 is adapted to be pivotally mounted on a rearwardly projecting mount 42 on tractor 18 by virtue of a pin 44 passing through the aligned openings 28 and 30 of the corresponding plate members 24 and 26.

It is noted that mounts 42, which are normally parallel and horizontally spaced, form parts of a conventional multiple point mounting system carried by tractor 18 between the wheels 46 thereof and below and behind the operator seat 48 thereof.

In the embodiment of FIG. 1, tractor 18 is provided with a 3-point mounting system with the mounts 42 being disposed below and on opposite sides of a third mount 50 which is adapted to be secured to unit 10 in a manner to be described.

The journal means at the rearmost ends of hitches 12 and 14 are adapted to receive therewithin an elongated shaft 52 carried by implement 20 at the forwardmost extremity thereof. Shaft 52 is rotatably mounted between bands 32 and 34 of each of hitches 12 and 14 and, since shaft 52 is rigid to implement 20, rotation of shaft 52 about the longitudinal axis thereof, causes implement 20 to swing in a vertical arc denoted by the arcuate line 54.

It is to be noted that implement 20 includes a support 56 having banks of ground-engaging spring tines 58 thereon in depending relationship thereto. Elongated structure 60 rigid to support 56, interconnects shaft 52 with support 56. Shaft 52, as shown in FIG. 1, is normally horizontally disposed and positioned transversely to the direction of motion of tractor 18 and implement 20.

Each plate member 26 is provided with an opening 62 therein adjacent the forwardmost end thereof for receiving the proximal end of beam 16. Beam 16 projects through and outwardly from opening 62 and abuts the inner surface of the corresponding plate member 24. Beam 16 is secured to hitches 12 and 14 by fastening the proximal ends of beam 16 to plate members 24 and 26 in any suitable manner such as by welding or the like. To this end, the ends of beam 16 abutting plate members 24, are welded to the latter, and beam 16 is welded to plate members 26 at the junction therebetween proximal openings 62.

Structure for mounting device 22 on unit 10 comprises a generally U-shaped element 64 having a pair of opposed legs 66 interconnected by a bight 68 at the normally forwardmost ends of legs 66, it being noted that the rearmost ends of legs 66 are secured in spaced relationship to beam 16 in any suitable manner, such as by welding. Further, it is understood that legs 66 are inclined relative to the horizontal for spacing device 22 out of engagement with beam 16. Bight 68 is provided with an upwardly and rearwardly extending ear 70 thereon having an opening 72 therethrough for receiving a pin 74 forming releasable means on one end of power device 22. Bight 68 is disposed forwardly of the forwardmost ends of hitches 12 and 14 and above the plane of the latter by virtue of the inclination of legs 66.

A crank 76 is secured to shaft 52 intermediate the ends thereof and in horizontal alignment with ear 70 of bight 68. When implement 20 is in the normally lowermost position thereof, crank 76 extends radially upwardly and rearwardly from shaft 52 as is clear in FIG. 1.

Device 22 includes a cylinder 78 having fluid inlets 80 and 82 thereon at opposed ends thereof for directing fluid therewithin for shifting a piston (not shown) connected to a piston rod 84 in opposed directions responsive to the actuation of control means on tractor 18 adjacent seat 48 thereof. Cylinder 78 is provided with a lug 86 thereon extending generally forwardly thereof and engageable with ear 70 and secured to the latter by means of pin 74 being inserted into opening 72. Rod 84 is pivotally connected at the normally rearmost end thereof to crank 76 by virtue of a pin 88. In the position shown in FIG. 1, device 22 is inclined relative to the horizontal so as to clear beam 16 and, therefore, be capable of actuation unimpeded by any of the structure. It is to be noted that element 64 is U-shaped to reduce the tendency of lateral bending thereof whenever device 22 is actuated.

Means is provided on unit 10 for interconnecting the latter with the third mount 50 of tractor 18. To this end, a U-shaped standard 90 is secured to beam 16 intermediate the ends thereof and projects upwardly and generally forwardly thereof. Standard 90 is provided with a pair of generally parallel sides 92 which are secured at the lowermost ends thereof in any suitable manner such as by welding, to beam 16 adjacent the zone of interconnection of legs 66 to beam 16. A bight 94 interconnects sides 92 at the normally uppermost ends thereof, and a pair of normally upright, parallel projections 96 is secured to bight 94 intermediate the ends thereof. Projections 96 are provided with aligned openings 98 therein for receiving a pin 100 therethrough to interconnect the third mount 50 to projections 96. Sides 92 are inclined forwardly so as to substantially vertically align projections 96 with the forwardmost ends of hitches 12 and 14, thus rendering unit 10 suitable for attachment with the mounting means on tractor 18.

In operation, unit 10 is mounted on tractor 18 so that the forwardmost ends of hitches 12 and 14 are mounted on mounts 42 by virtue of pins 44 and projections 96 receive therebetween the third mount 50, it being understood that pin 100 interconnects third mount 50 with projections 96. Shaft 52 of implement 20 is received between bands 34 at each rearmost end of hitches 12 and 14, and device 22 spans the distance between and interconnects ear 70 with crank 76.

When it is desired to move implement 20 into any one of a number of operative positions, fluid is delivered into cylinder 78 in the proper direction to move the piston within cylinder 78 and thereby shift the piston rod 84. For instance, if it is desired to raise implement 20 from the position illustrated in FIG. 1, fluid is directed into inlet 82 to shift rod 84 forwardly, and thereby rotate crank 76 and shaft 52 about its longitudinal axis of the latter. Rotation of shaft 52 causes implement 20 to rotate in the vertical arc denoted by arcuate line 54.

When implement 20 is in the raised position, the same may be lowered by directing fluid into inlet 80 of cylinder 78 so as to shift rod 84 rearwardly and thereby rotate shaft 52 in the opposite direction. Implement 20 is thus lowered toward the ground therebeneath.

Since the multiple point mounting system of tractor 18 is capable of elevating unit 10, a combination of shifting movements of the mounting system and rotation of shaft 52 is sufficient to dispose implement 20 in any one of a number of operative positions so that implement 20 may be tilted forwardly or rearwardly, depending upon the work to be accomplished thereby.

A second embodiment of the instant invention is illustrated in FIG. 3 and is adapted to be utilized with a 2-point mounting system of tractor 118, the latter having a pair of horizontally spaced, parallel mounts 142 projecting rearwardly therefrom. The hitch unit of the second embodiment is broadly denoted by the numeral 110 and includes a pair of elongated parallel hitches 112, only one of which is shown in FIG. 3.

Hitches 112 are interconnected by a beam 116 intermediate the forward and rear ends of hitches 112. Fastening means in the nature of horizontally spaced openings 128 is provided for each hitch 112 adjacent the forwardmost end thereof. Openings 128 are alignable with corresponding openings 129 in mounts 142 and receive therein pins 144 for securing hitches 112 to mounts 142.

Journal means 132 is provided at the normally rearmost end of each hitch 112 for rotatably mounting a transversely extending, horizontally disposed shaft 152 rigid to the normally forwardmost extremity of a farm implement 120. Journal means 132 comprises arcuate bands much in the nature of bands 32 and 34 of the embodiment illustrated in FIGS. 1 and 2.

A power device 122 is supported by unit 110 and interconnects the latter with a crank 176 secured to shaft 152 intermediate the ends thereof and in alignment with an ear 170 secured to the bight (not shown) of a U-shaped element 164 secured to beam 116. Element 164 is provided with inclined legs 166 secured at the rearmost ends thereof to spaced points on beam 116. Legs 166 are inclined relative to the horizontal to space device 122 out of engagement with beam 116. Ear 170 extends upwardly and rearwardly of the bight of element 164 and pivotally mounts a lug 186 at one end of device 122 by means of pin 174.

The device 122 is provided with a cylinder 178 having opposed inlets 180 and 182 thereon for directing hydraulic fluid therewithin to shift a piston (not shown) connected to a piston rod 184 in opposed directions. Rod 184 is pivotally mounted on crank 176 by means of a pin 188 to thereby interconnect unit 110 with crank 176.

In operation, fluid is directed into either of the inlets 180 and 182 to raise and lower implement 120 and thereby move the latter into any one of a number of operative positions. Since hitches 112 are rigid to mount 142, the movement of rod 184 in either of the directions of movement thereof, is sufficient to rotate shaft 152 and thereby, raise or lower implement 120 relative to tractor 118. For instance, if it is desired to raise implement 120 from the position illustrated in FIG. 3, fluid is directed into inlet 182 and rod 184 shifts forwardly to rotate shaft 152 in a counterclockwise sense to thereby swing implement 120 upwardly in a vertical arc. Conversely, when it is desired to lower implement 120, fluid is directed into inlet 180 to force rod 184 rearwardly and thereby rotate shaft 152 in a clockwise direction.

Having thus described the invention, what is claimed as new and desired to be secured by Letters Patent is:

1. A power coupling for attaching an implement having a rotatable shaft to a three-point power lift of a tractor, said coupling comprising;
    a beam;
    a pair of hitches rigidly secured to the beam and each provided with means for rotatably receiving said shaft and each having means for connecting the same for swinging movement on one of the points of said lift;
    an upstanding standard rigid to said beam and having means for pivotally connecting the same with a third of said points of the lift;
    a forwardly extending structural element rigid to said beam; and
    a fluid piston and cylinder assembly pivotally connected to the forwardmost end of said element and adapted for operable connection with said shaft to rotate the latter.

2. For a power lift of a tractor having a pair of vertically swingable lifting arms and a vertically swingable stabilizer arm, a power coupling comprising:
    a beam;
    a pair of spaced hitches rigid to the beam and each provided with means at the forwardmost end thereof for pivotally attaching the same to a corresponding lifting arm;
    an upstanding standard rigid to the beam and provided with means at its uppermost end for pivotally connecting the same to the stabilizing arm;
    implement journaling means on the rearmost end of each of said hitches respectively;
    a forwardly and rearwardly disposed structural element rigid to said beam; and
    a fluid piston and cylinder assembly pivotally connected to said element at the forwardmost and uppermost end of the latter for swinging the implement with respect to the hitch when the assembly is operably coupled therewith.

3. A power unit for connecting an implement with a tractor, said unit comprising:
- a horizontal beam normally disposed transversely of the path of travel of the tractor;
- a pair of hitches extending fore and aft of the tractor and secured intermediate their ends to the outermost ends of said beam, each hitch having journal means for swingably attaching the implement thereto and pivot means for swingably attaching the unit to the tractor;
- an upwardly and forwardly extending standard adapted for pivotal connection with the tractor to stabilize the unit; and
- a power device mount extending forwardly and upwardly from said beam, there being means at the forwardmost and uppermost end of said mount for pivotally receiving a power device to control the implement separate from the tractor.

References Cited in the file of this patent
UNITED STATES PATENTS

| | | |
|---|---|---|
| 2,575,801 | Evans | Nov. 20, 1951 |
| 2,731,898 | Frevik et al. | Jan. 24, 1956 |
| 2,755,721 | Rusconi | July 24, 1956 |

OTHER REFERENCES

Plugfabrik, German application P14,454, printed Aug. 9, 1956 (Klasse 45a–24.02).